United States Patent [19]

Oshizawa et al.

[11] Patent Number: 4,800,861
[45] Date of Patent: Jan. 31, 1989

[54] FUEL INJECTION SYSTEM ELECTROMAGNETIC-VALVE CONTROLLED TYPE

[75] Inventors: Hidekazu Oshizawa; Masataka Ishikawa, both of Higashimatsuyama, Japan

[73] Assignee: 501 Diesel Kiki Co., Ltd., Tokyo, Japan

[21] Appl. No.: 177,994

[22] Filed: Apr. 5, 1988

[30] Foreign Application Priority Data

Apr. 23, 1987 [JP] Japan .................................. 62-98705

[51] Int. Cl.⁴ ........................................ F02M 39/00
[52] U.S. Cl. ................................ 123/506; 123/179 L
[58] Field of Search ................... 123/506, 494, 179 L, 123/458, 449, 500, 501

[56] References Cited

U.S. PATENT DOCUMENTS

| | | | |
|---|---|---|---|
| 4,395,987 | 8/1983 | Kobayashi | 123/506 |
| 4,546,749 | 10/1985 | Igashira | 123/506 |
| 4,586,480 | 5/1986 | Kobayashi | 123/506 |
| 4,630,588 | 12/1986 | Sagawa | 123/506 |
| 4,653,452 | 3/1987 | Sawada | 123/179 L |
| 4,681,079 | 7/1987 | Kaneta | 123/179 L |
| 4,683,859 | 8/1987 | Tamura | 123/179 L |
| 4,705,004 | 11/1987 | Takahashi | 123/179 L |
| 4,714,068 | 12/1987 | Nagase | 123/506 |

Primary Examiner—Carl Stuart Miller
Attorney, Agent, or Firm—Wegner & Bretschneider

[57] ABSTRACT

In a fuel injection system for an engine, a first controller calculates circuit rotational angle of a crankshaft on the basis of reference pulses and scale pulses from a detector for detecting rotation of the crankshaft. The first controller outputs a drive pulse representative of a closing command moving an electromagnetic valve to a closed position, at a timing with reference to the current rotational angle, to control a period, within which the valve is in the closed position, during forward stroke of a plunger. A second controller intermittently outputs drive pulses representative of the closing command, at an initial stage of engine start-up, independently of the crankshaft rotational angle. A time duration of each drive pulse from the second controller is shorter than a time duration required for the plunger forward stroke, and a period within which each drive pulse is not outputted from the second controller is also shorter than the time duration required for the plunger forward stroke.

11 Claims, 5 Drawing Sheets

FUEL INJECTION SYSTEM ELECTROMAGNETIC-VALVE CONTROLLED TYPE

BACKGROUND OF THE INVENTION

The present invention relates to a system for controlling fuel injection by means of an electromagnetic valve.

A fuel injection system of electromagnetic-valve controlled type for use in diesel engines is disclosed, for example, in Japanese Patent Appln. Laid-Open Nos. 56-151228, 56-154134, 61-268844, 61-286541 and 61-286716, U.S. Pat. No. 4,395,987 corresponding to the above Japanese Patent Appln. Laid-Open Nos. 56-151228 and 56-154134, and U.S. Ser. No. 865,125 filed on May 8, 1986 corresponding to the above Japanese Patent Appln. Laid-Open No. 61-268844. The fuel injection system of this kind comprises a fuel injection pump as a basic component. The fuel injection pump includes a pump housing, a plunger associated with the pump housing for reciprocative movement in interlocked relation to a crankshaft of the engine, and a fuel pressurizing chamber associated with the pump housing and having a volume variable in response to reciprocative movement of the plunger. The fuel pressurizing chamber communicates with a fuel supply source through a supply passage, and communicates with fuel injection nozzles of the engine through forcible delivery passage means. The supply passage is closed during a major portion of a forward stroke of the plunger, and is opened during a backward stroke of the plunger. In addition, a release passage is provided, which is connected to the fuel pressurizing chamber and which is adapted to be opened and closed by an electromagnetic valve. During the forward stroke of the plunger which reduces the volume of the pressurizing chamber, the fuel is released from the fuel pressurizing chamber through the release passage for a period within which the electromagnetic valve is in an open position. On the other hand, the fuel is forcibly delivered to the fuel injection nozzles of the engine through the forcible-delivery passage means only for a period within which the electromagnetic valve is in a closed position.

The above-described electromagnetic valve is usually controlled in the following manner. That is, rotation detecting means outputs reference pulses each indicative of passage of the engine crankshaft through a reference rotational position, and scale pulses indicative of angular movement of the crankshaft every a predetermined angular extent. In response to receipt of the reference pulses and the scale pulses from the rotation detecting means, control means calculates current rotational angle of the crankshaft and current number of revolutions per unit time or rotational speed thereof. The control means also receives data from a sensor for detecting an amount of depression of an accelerator pedal and a sensor for detecting temperature of engine cooling water. On the basis of these data and the engine rotational speed calculated as described above, the control means calculates a target injection timing and a target fuel injection amount. On the basis of the results of this calculation, the control means outputs a drive pulse for a closing command to a drive circuit for the electromagnetic valve. The drive pulse has a time duration corresponding to the target fuel injection amount. The drive pulse is outputted when the current rotational angle of the engine crankshaft reaches a target injection timing.

By the way, in the system disclosed in the above patents, a starter motor is operated at start-up of the engine to rotate the crankshaft. The plunger is reciprocated in interlocked relation to the crankshaft. In this connection, the control means cannot calculate the rotational angle of the crankshaft, until the control means receives the first reference pulse from the rotation detecting means, indicative of passage of the crankshaft through the reference rotational position. By this reason, the control means does not output the drive pulse for the closing command to the drive circuit for the electromagnetic valve. Thus, during the forcible-delivery stroke of the plunger, the fuel within the fuel pressurizing chamber is released through the release passage means, so that the fuel is not injected. Accordingly, at the initial stage of the start-up, torque due to combustion of fuel is not entirely generated, but torque is generated only by the starter motor. Thus, such a problem might arise that the start-up is not stabilized.

In a fuel injection system disclosed in Japanese Patent Application Laid-Open No. 61-258951, the electromagnetic valve is maintained closed until the reference pulses each indicative of passage of the crankshaft through the reference rotational position is outputted, and fuel is injected over the entire period of the forward stroke of the plunger. Since, in this system, fuel injection is carried out from the beginning at the engine start-up, the start-up is stabilized. However, the system has such a problem that, because the fuel is supplied excessively, black smoke is produced from the engine.

Japanese Patent Application Laid-Open No. 61-8440 discloses a system in which when a microcomputer is temporarily brought to a malfunction state at the start-up, a drive pulse of a given duty ratio is outputted to an actuator, and a control rack of the fuel injection pump is controlled by the actuator so as to be brought to a predetermined position, thereby controlling the fuel injection amount to a predetermined value. However, the system is not of electromagnetic-valve controlled type, and is not believed relevant to the present invention.

SUMMARY OF THE INVENTION

It is an object of the invention to provide a fuel injection system for an engine, in which fuel is supplied from the initial stage of the engine start-up, and excessive supply of fuel is prevented to avoid generation of black smoke from the engine.

According to the invention, there is provided a fuel injection system for an engine, comprising:
(a) a fuel injection pump having a pump housing, a plunger associated with the pump housing and reciprocatively movable in relation to rotation of a crankshaft of the engine, and a fuel pressurizing chamber associated with the pump housing and variable in volume in response to reciprocative movement of the plunger;
(b) supply passage means supplying fuel to the fuel pressurizing chamber, the supply passage means being closed substantially during a forward stroke of the plunger and being opened substantially during a backward stroke of the plunger;
(c) forcible-delivery passage means connecting the fuel pressurizing chamber to at least one fuel injection nozzle of the engine;

(d) release passage means communicating with the fuel pressurizing chamber;

(e) an electromagnetic valve provided in the release passage means and movable between a closed position where the release passage means is closed and an open position where the release passage means is opened, the fuel being released from the fuel pressurizing chamber through the release passage means for substantially a period within which the electromagnetic valve is in the open position and within which the plunger is in the forward stroke, the fuel being permitted to be pressurized within the fuel pressurizing chamber for substantially a period within which the electromagnetic valve is in the closed position and within which the plunger is in the forward stroke, the pressurized fuel being forcibly delivered to the fuel injection nozzle of the engine through the forcible-delivery passage means;

(f) rotation detecting means for substantially detecting passage of the crankshaft of the engine through a reference rotational position to output a reference pulse each time the crankshaft passes through the reference rotational position, and for substantially detecting angular movement of the crankshaft every a predetermined angular extent to output scale pulses;

(g) first control means receiving each reference pulse and the scale pulses from the rotation detecting means to calculate current rotational angle of the crankshaft, the first control means outputting a drive pulse representative of a command moving the electromagnetic valve to the closed position, at a timing with reference to the current rotational angle, to control a period, within which the electromagnetic valve is in the closed position, during the forward stroke of the plunger, thereby controlling fuel injection; and (h) second control means intermittently outputting drive pulses representative of the command moving the electromagnetic valve to the closed position, at an initial stage of start-up of the engine, independently of the rotational angle of the crankshaft at least based on the reference pulses, wherein a time duration of each of the drive pulses outputted from the second control means is shorter than a time duration required for the forward stroke of the plunger, and a period within which each of the drive pulses is not outputted from the second control means is also shorter than the time duration required for the forward stroke of the plunger.

DETAILED DESCRIPTION

Figure 1:
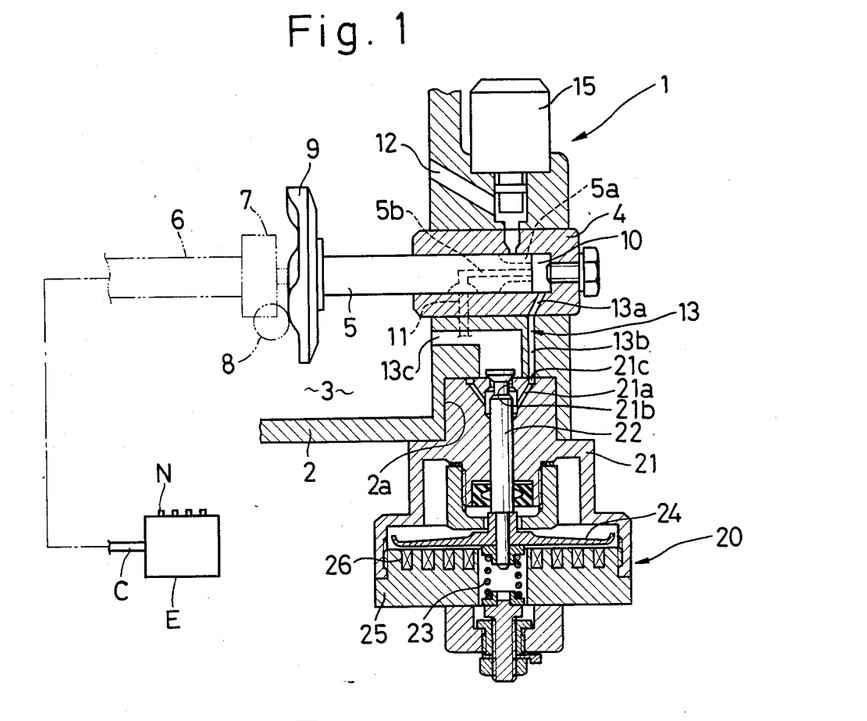
FIG. 1 is a cross-sectional view showing a fuel injection pump and an electromagnetic valve of a fuel injection system according to the invention.

An embodiment of the invention will be described below with reference to FIGS. 1 through 4. FIG. 1 shows a distributor type fuel injection pump 1 for use in a diesel engine for a vehicle. The fuel injection pump 1 comprises a pump housing 2 having defined therein a low pressure chamber 3. The low pressure chamber 3 is filled with low pressure fuel from a fuel pump (not shown) which is arranged within the pump housing 2 and which is driven by a drive shaft 6 subsequently to be described.

A plunger barrel 4 is fixedly inserted into a side wall of the pump housing 2. A plunger 5 has one end portion which is inserted into the plunger barrel 4 for reciprocative movement and rotation relative thereto. The other end of the plunger 5 is connected, through a coupler 7, to one end of the drive shaft 6 coaxial to the plunger 5 in such a manner that rotation can be transmitted from the drive shaft 6 to the plunger 5 and that the plunger 5 is permitted to axially move relatively to the one end of the drive shaft 6. The drive shaft 6 extends through the wall of the pump housing 2 and has the other end projecting out of the pump housing 2. A crankshaft C of an engine E is connected to the projecting other end of the drive shaft 6 through reduction gear wheels (not shown). Thus, rotation of the crankshaft C is transmitted to the drive shaft 6.

Within the pump housing 2, a ring-like roller holder (not shown) is arranged around the coupler 7, and a plurality of rollers 8 (only one shown) are supported by the roller holder. On the other hand, a face cam 9 is fixedly mounted to the other end of the plunger 5. The face cam 9 is biased by a spring (not shown) into contact with the rollers 8. Thus, the plunger 5 is rotated by rotational force transmitted thereto from the drive shaft 6 and is reciprocated axially under the camming action of the rollers 8 and the face cam 9.

The plunger barrel 4 has defined at its bottom a fuel pressurizing chamber 10 which is variable in volume in response to reciprocative movement of the plunger 5.

The plunger barrel 4 and the wall of the pump housing 2 are formed therein with a plurality of forcible-delivery passages 11 (only one shown) corresponding in number to cylinders of the engine E, and with a single supply passage 12.

The forcible-delivery passages 11 have their respective one ends which open to an inner surface of the plunger barrel 4. The other ends of the respective forcible-delivery passages 11 are connected respectively to delivery valves (not shown) which are mounted to the pump housing 2 and which correspond in number to the engine cylinders. The delivery valves are connected respectively to fuel injection nozzles N of the engine E through respective pipes each of which forms an extension of a corresponding one of the forcible-delivery passages 11.

The supply passage 12 has one end thereof which opens to the inner surface of the plunger barrel 4, and the other end which opens to the low pressure chamber 3.

A plurality of groove-like suction passages 5a corresponding in number to the engine cylinders are formed in the peripheral surface of the plunger 5 adjacent the one end thereof in circumferentially equidistantly spaced relation to each other. A single L-shaped discharge passage 5b is formed in the one end portion of the plunger 5. The discharge passage 5b is comprised of an axial section extending along an axis of the plunger 5 and a radial section extending at right angles to the axis of the plunger 5. The discharge passage 5b has one end which opens to one end face of the plunger 5, and the other end which opens to the peripheral surface of the plunger 5.

During a backward stroke of the plunger 5 at which the one end face of the plunger 5 moves away from the bottom of the plunger barrel 4, any one of the plurality of suction passages 5a is brought into communication with the supply passage 12, so that the fuel within the low pressure chamber 3 is supplied to the fuel pressurizing chamber 10 through the supply passage 12 and the suction passage 5a. During a major portion of a forward stroke of the plunger 5 at which the one end face of the plunger 5 moves toward the bottom of the plunger barrel 4, the supply passage 12 is closed by the peripheral surface of the plunger 5.

A cut-off electromagnetic valve 15 is mounted to the pump housing 2 to open the supply passage 12 during running of the engine E.

During the forward stroke of the plunger 5, the discharge passage 5b is brought into communication with any one of the plurality of forcible-delivery passages 11.

The fuel injection pump 1 is further formed therein with a release passage 13 which is comprised of a passage section 13a formed in the plunger barrel 4 and two passage sections 13b and 13c formed in the wall of the pump housing 2. The passage sections 13a and 13b communicate with each other. The passage section 13a has one end which opens to the fuel pressurizing chamber 10. The passage section 13b has one end which opens to a recess 2a formed in the wall of the pump housing 2. The passage 13c has one end which opens to the recess 2a, and the other end which opens to the low pressure chamber 3.

An electromagnetic valve 20 of normally open type is mounted to the wall of the pump housing 2. The electromagnetic valve 20 has a body 21 which has one end portion fixedly inserted into the recess 2a of the pump housing 2. The one end portion of the body 21 has an axial end face formed therein with an annular groove 21c. A plurality of passages 21a are formed in the one end portion of the body 21. The passages 21a are inclined with respect to an axis of the body 21, and are equidistantly spaced from each other about the axis of the body 21. The inclined passages 21a have their respective one ends in communication with the annular groove 21c. The other ends of the respective inclined passages 21a communicate with a passage 21b which is formed in the one end portion of the body 21 and which extends along the axis thereof. The annular groove 21c, the passages 21a and the passage 21b form a part of the release passage 13. That is, the passages 21a communicate with the passage section 13b through the annular groove 21c, and the passage 21b communicates with the passage section 13c. A poppet valve member 22 is slidably supported in the body 21, and has a forward end which can open and close an opening end of the passage 21b and, accordingly, the release passage 13.

The poppet valve member 22 is biased by a coil spring 23 in such a direction as to open the release passage 13. An armature 24 is fixedly mounted to a base end of the poppet valve member 22, and a stator 25 is fixedly mounted to the other end of the body 21. A solenoid 26 is embedded in an end face of the stator 25 which is confronted with the armature 24. When the solenoid 26 is energized, the armature 24 is attracted toward the stator 26, whereby the poppet valve member 22 closes the release passage 13 against the coil spring 23.

The release passage 13 is closed only for a period selected by control of the electromagnetic valve 20. For substantially the period within which the release passage 13 is closed and within which the plunger 5 is in the forward stroke, the fuel within the fuel pressurizing chamber 10 is pressurized. When pressure of the pressurized fuel is brought to a value higher than the opening pressure of the delivery valves, and is further brought to a value higher than the opening pressure of the fuel injection nozzles N of the engine E, the pressurized fuel is injected from a selected one of the fuel injection nozzles N through the discharge passage 5b and a corresponding one of the forcible-delivery passages 11 and through a corresponding one of the delivery valves and a corresponding one of the pipes.

Figure 2:
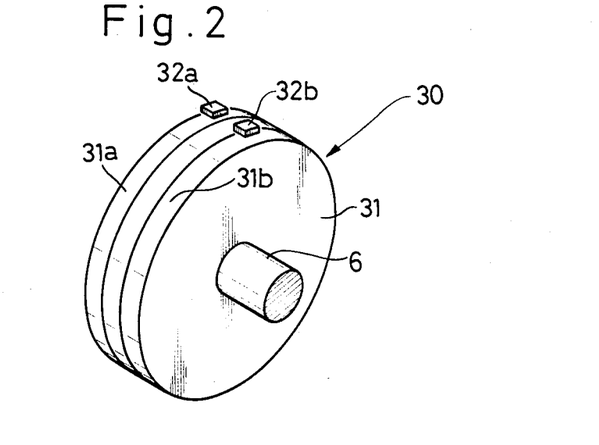
FIG. 2 is a perspective view of rotation detecting means employed in the fuel injection system illustrated in FIG. 1.

The fuel injection system comprises rotation detecting means 30 illustrated in FIG. 2. Specifically, a rotor 31 is fixedly mounted to the portion of the drive shaft 6 which projects out of the pump housing 2. A reference track 31a and a scale track 31b are formed along a peripheral surface of the rotor 31. A specific location on the reference track 31a is magnetized to have N and S poles. N and S poles are alternately arranged along the scale track 31b every an angular extent of 10 degrees, for example. A reference point detecting sensor 32a and a scale detecting sensor 32b each formed by a Hall effect element are arranged around the peripheral surface of the rotor 31 and are slightly spaced radially outwardly from the respective tracks 31a and 31b. The reference point detecting sensor 32a outputs a reference pulse Re each time the specific location on the reference track 31a passes by the reference point detecting sensor 32a, to thereby detect that the crankshaft C passes through the reference rotational position. On the other hand, the scale detecting sensor 32b outputs a scale pulse Sc each time the drive shaft 6 angularly moves by the predetermined angular extent, for example, by 10 degrees, to thereby detect angular movement of the crankshaft C every an angular extent of 20 degrees.

Figure 3:
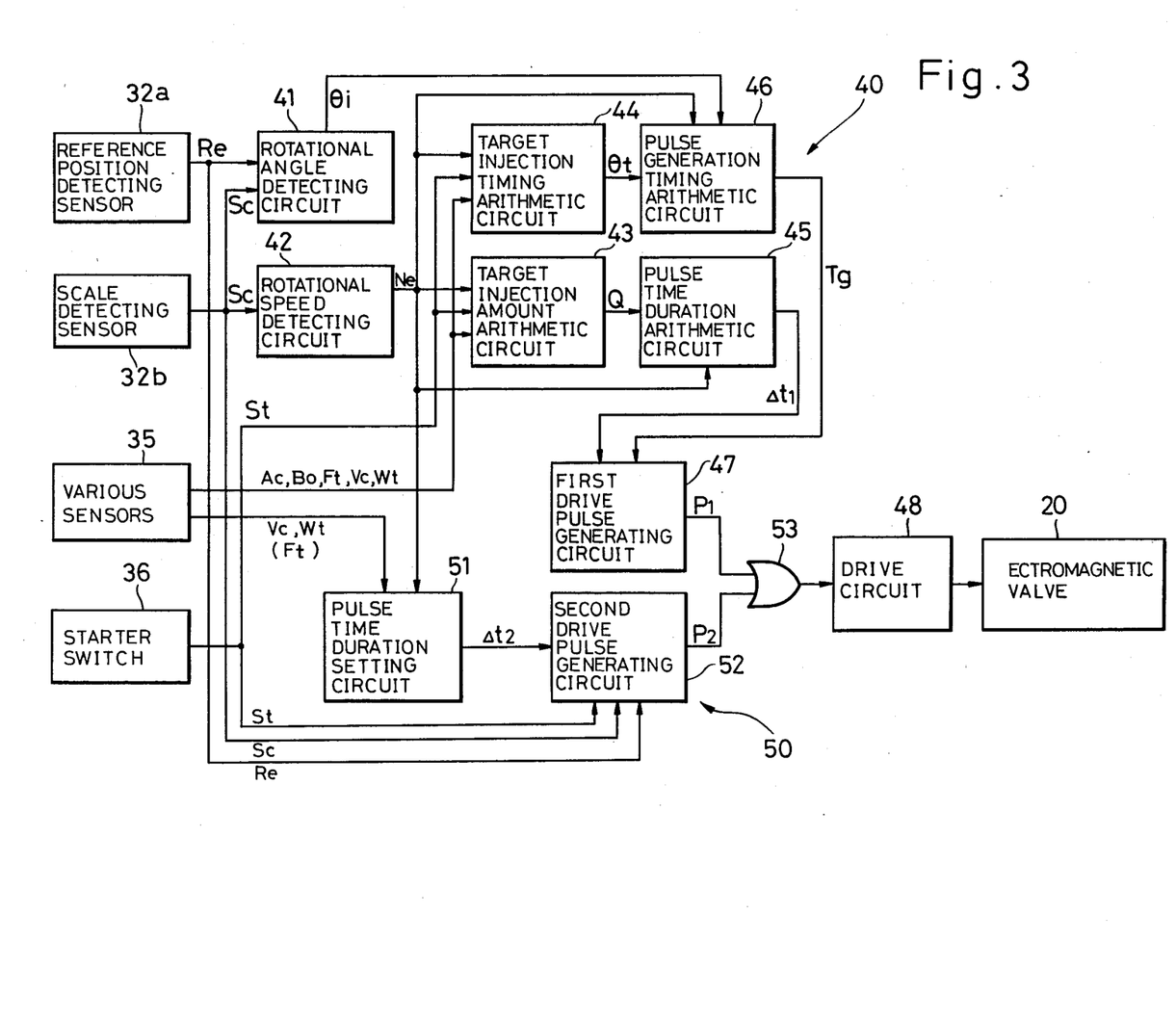
FIG. 3 is a circuit block diagram of first and second control means incorporated in the fuel injection system illustrated in FIG. 1.

The fuel injection system comprises first control means 40, as shown in FIG. 3, for controlling movement of the electromagnetic valve 20 between the open and closed positions.

The first control means 40 includes a rotational angle detecting circuit 41 and a rotational speed detecting circuit 42. The rotational angle detecting circuit 41 receives each reference pulse Re from the reference point detecting sensor 32a and the scale pulses Sc from the scale detecting sensor 32b following the reference pulse Re, to calculate current rotational angle $\theta i$ of the crankshaft C. The rotational angle $\theta i$ is represented by graduations each corresponding to one scale pulse, that is, to the angular extent of 20 degrees. The rotational speed detecting circuit 42 receives the scale pulses Sc from the scale detecting sensor 32b to calculate the number of revolutions per unit time, that is, rotational speed Ne of the crankshaft C. Waveform shaping circuits and the like are interposed between the sensors 32a and 32b and the detecting circuits 41 and 42, but are omitted from FIG. 3.

The first control means 40 further includes a target injection amount arithmetic circuit 43 and a target injection timing arithmetic circuit 44. Each of the arithmetic circuits 43 and 44 receives the signal Ne indicative of the engine rotational speed from the rotational speed detecting circuit 42. Each of the arithmetic circuits 43 and 44 also receives detecting signals indicative of an accelerator depression amount Ac, a boost pressure Bo, a fuel temperature Ft, a battery voltage Vc, engine cooling water temperature Wt and the like, from various sensors 35 which are shown in a lump in FIG. 3 for simplification of illustration. On the basis of these data, the arithmetic circuits 43 and 44 calculate a target injection amount Q and a target injection timing $\theta t$, respectively. The output signals from the sensors 35 are digitalized by A/D (analog/digital) converters (not shown). The target injection timing $\theta t$ is represented by the rotational angle of the crankshaft C at the initiation of fuel injection.

A starter signal St from a starter switch 36 is further inputted into each of the target injection amount arithmetic circuit 43 and the target injection timing arithmetic circuit 44. The circuits 43 and 44 carry out such calculation as to increase the fuel injection amount at the start-up as compared with that within a period of usual engine running, and to expedite the fuel injection timing. Additionally, as is well known, when the starter switch 36 is turned on, the starter motor is driven to forcibly rotate the crankshaft C of the engine E. The ON signal of the starter switch 36 forms the starter signal St.

On the basis of the target injection amount Q from the target injection amount arithmetic circuit 43 and the engine rotational speed Ne from the rotational speed arithmetic circuit 42, a pulse time duration arithmetic circuit 45 calculates a pulse time duration $\Delta t_1$ corresponding to a time duration for which the release passage 13 is closed.

On the basis of the detected rotational angle $\theta i$ having its minimum unit corresponding to one scale pulse Sc, from the rotational angle detecting circuit 41, and the engine rotational speed Ne, a pulse generation timing arithmetic circuit 46 calculates an accurate current rotational angle of the crankshaft C. When this actual rotational angle is brought into coincident with the rotational angle $\theta t$ representative of the target injection timing, the pulse generation timing arithmetic circuit 46 outputs a trigger signal Tg.

When a first drive pulse generation circuit 47 receives the trigger signal Tg from the pulse generation timing arithmetic circuit 46, the first drive pulse generation circuit 47 outputs a drive pulse $P_1$ to a drive circuit 48 for actuating the electromagnetic valve 20. The drive pulse $P_1$ has a time duration which is determined by the pulse time duration from the pulse time duration arithmetic circuit 45. At the initiating point of the drive pulse $P_1$, the solenoid 26 of the electromagnetic valve 20 is excited to close the release passage 13, thereby initiating fuel injection. At the terminating point of the drive pulse $P_1$, the solenoid 26 is demagnetized to open the release passage 13, thereby terminating the fuel injection. As a result, optimum fuel injection control is carried out in compliance with the condition of the engine E and other running conditions. The drive pulse $P_1$ is outputted only once during the forward stroke of the plunger 5 and, accordingly, fuel injection is effected only once.

The above-described arrangement and function of the first control means 40 are substantially the same as those of a conventional one.

By the way, until the crankshaft C reaches the reference rotational position at the start-up, the reference point detecting sensor 32a does not output the reference pulse Re. Accordingly, the rotational angle detecting circuit 41 cannot calculate the rotational angle $\theta i$ of the crankshaft C, so that the trigger signal Tg is not outputted from the pulse generation timing arithmetic circuit 46. Therefore, the drive pulse $P_1$ is not also outputted from the first drive pulse generating circuit 47.

The fuel injection system of the invention is further provided with second control means 50. The second control means 50 comprises a pulse time duration setting circuit 51, and a second drive pulse generating circuit 52 which receives information from the circuit 51 to output drive pulses $P_2$. The outputs from the respective first and second drive pulse generating circuits 47 and 52 are sent to the drive circuit 48 through an OR circuit 53.

The pulse time duration setting circuit 51 calculates a time duration $\Delta t_2$ of each of the drive pulses $P_2$ on the basis of the battery voltage Vc and the engine cooling water temperature Wt. It is necessary to increase the torque generated due to combustion of fuel when the battery voltage Vc is low so that the rotational torque of the starter motor is low and when the engine cooling water Wt is low so that the viscosity of lubricating oil is high. Accordingly, the lower the battery voltage Vc and the cooling water temperature Wt, the more the pulse time duration $\Delta t_2$ is lengthened, while the higher the battery voltage Vc and the cooling water temperature Wt, the more the pulse time duration $\Delta t_2$ is shortened. However, in view of the relation that the drive pulses $P_2$ are outputted in synchronism with the scale pulses Sc subsequently to be described, the pulse time duration $\Delta t_2$ is determined correspondingly also to the engine rotational speed Ne. That is, the pulse time duration $\Delta t_2$ is determined such that the higher the rotational speed Ne, i.e., the shorter the pulse separation between each pair of adjacent scale pulses Sc, the shorter the pulse time duration $\Delta t_2$. By this reason, $\Delta t_2$ is possible to bring the drive pulses $P_2$ to a duty ratio corresponding to the battery voltage Vc and the engine cooling water temperature Wt. The pulse time duration $\Delta t_2$ is shorter than each drive pulse $P_1$, and is usually shorter than the pulse separation between each pair of adjacent scale pulses Sc.

Figure 4:
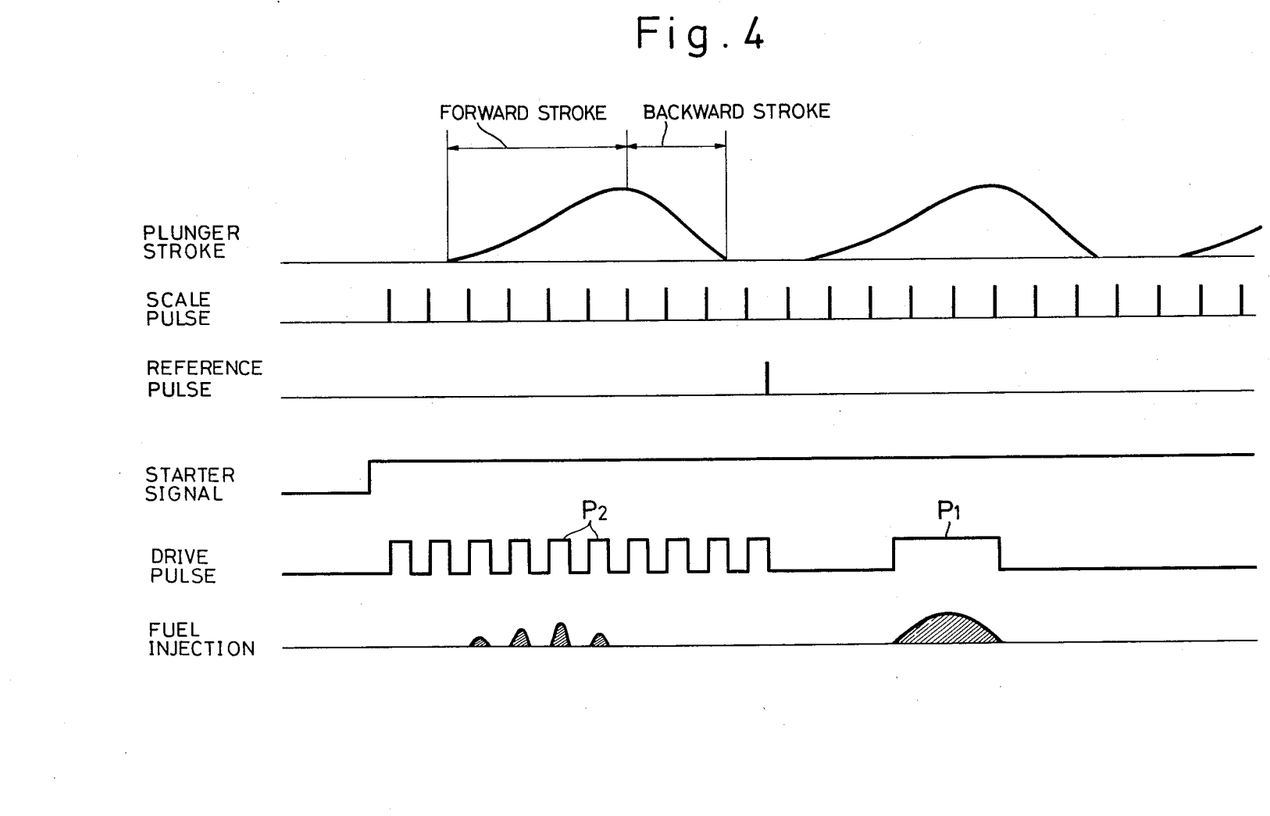
FIG. 4 is a time chart of fuel injection control at the initial stage of the start-up, which is realized by the fuel injection system illustrated in FIG. 1.

The second drive pulse generating circuit 52 receives the starter signal St from the starter switch 36. In response to receipt of the starter signal St, the circuit 52 initiates to output the drive pulses $P_2$ each having the time duration $\Delta t_2$ obtained by the above-described calculation, independently of the rotational angle of the crankshaft C. Since the drive pulse $P_2$ is outputted each time the scale pulse Sc is inputted, that is, each time the crankshaft C angularly moves by 20 degrees, the drive pulses $P_2$ are outputted a plurality of times during one forward stroke of the plunger 5. As a result, as shown in FIG. 4, the electromagnetic valve 20 is repeatedly opened and closed bit by bit during one forward stroke of the plunger 5, so that the fuel is intermittently injected.

Since the duty ratio of the drive pulses $P_2$ corresponds to the battery voltage and the cooling water temperature as described above, injection of an optimum amount of fuel can be realized, making it possible to ensure start-up of the engine, and to eliminate such a deficiency that black smoke is produced due to excessive fuel injection amount.

When the signals from the sensors 35 indicate that the battery voltage Vc is lower than, for example, 8 volts and that the engine cooling water is lower than 0 degree C., the pulse time duration setting circuit 51 outputs a fully closing command signal. When the second drive pulse generating circuit 52 receives the fully closing command signal, the circuit 52 continuously sends a drive signal of a high (H) level to the drive circuit 48. As a result, the fuel is injected for the entire period of the forward stroke of the plunger 5. It is preferable to bring the fuel injection amount to the maximum value when the battery voltage and the engine cooling water temperature are extremely low.

At the above-mentioned start-up, the crankshaft C of the engine E reaches the reference rotational angle for a period within which the crankshaft C of the engine E makes two revolutions, that is, for a period within which the drive shaft 6 makes one revolution. At this time, the first one of the reference pulses Re is sent from the reference point detecting sensor 32a to the drive pulse generating circuit 52, so that outputting of the drive pulses $P_2$ is halted. Then, the above-described usual start-up control due to the first control means 40 is initiated.

Figure 5:
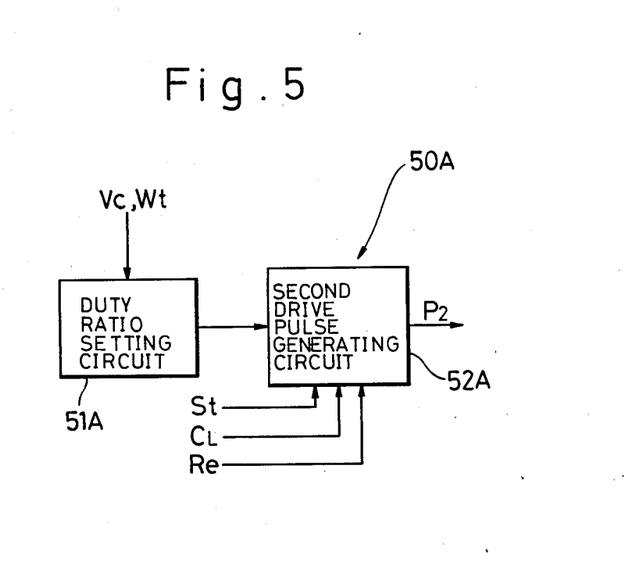
FIG. 5 is a circuit block diagram showing a modification of the second control means.

FIG. 5 shows a modification of the aforesaid second control means. The second control means 50A according to the modification has a duty ratio setting circuit 51A in substitution for the pulse time duration setting circuit 51 illustrated in FIG. 3. The duty ratio setting circuit 51A calculates the duty ratio of the drive pulses $P_2$, on the basis of the information on the engine cooling water temperature Wt and the battery voltage Vc. A second drive pulse generating circuit 52A is the same as the second drive pulse generating circuit 52 shown in FIG. 3 in that the circuit 52A initiates to output the drive pulses $P_2$ in response to receipt of the starter signal St and that the circuit 52A halts to output the drive pulses $P_2$ in response to receipt of the first one of the reference pulses Re. However, the second drive pulse generating circuit 52A is different from the circuit 52 of FIG. 3 in that the circuit 52A outputs the drive pulses $P_2$ on the basis of the aforesaid information on the duty ratio, at the timing of clock pulses CL in place of the scale pulses Sc.

Figure 6:
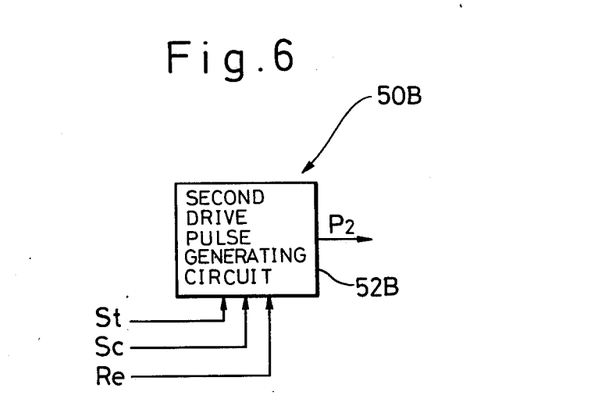
FIG. 6 is a circuit block diagram showing another modification of the second control means.

FIG. 6 shows second control means 50B according to another modification. The second control means 50B has a second pulse generating circuit 52B which is the same as the second drive pulse generating circuit 52 shown in FIG. 3 in that the circuit 52B begins to output the drive pulses $P_2$ in response to receipt of the starter signal St, halts to output the drive pulses $P_2$ in response to receipt of the first one of the reference pulses Re, and outputs the drive pulses $P_2$ in synchronism with the scale pulses Sc. However, the circuit 52B is different from the circuit 52 of FIG. 3 in the following point. That is, the second pulse generating circuit 52B switches its output alternately to a high level and a low level in synchronism with the scale pulses, to thereby output the drive pulses $P_2$ having a duty ratio of 50%. The arrangement may be such that the output is brought to the high level in response to one scale pulse Sc, the output is brought to the low level in response to the next but one scale pulse, and the output is brought to the high level at further next scale pulse, whereby the drive pulses $P_2$ having the duty ratio of about 67% are outputted.

Figure 7:
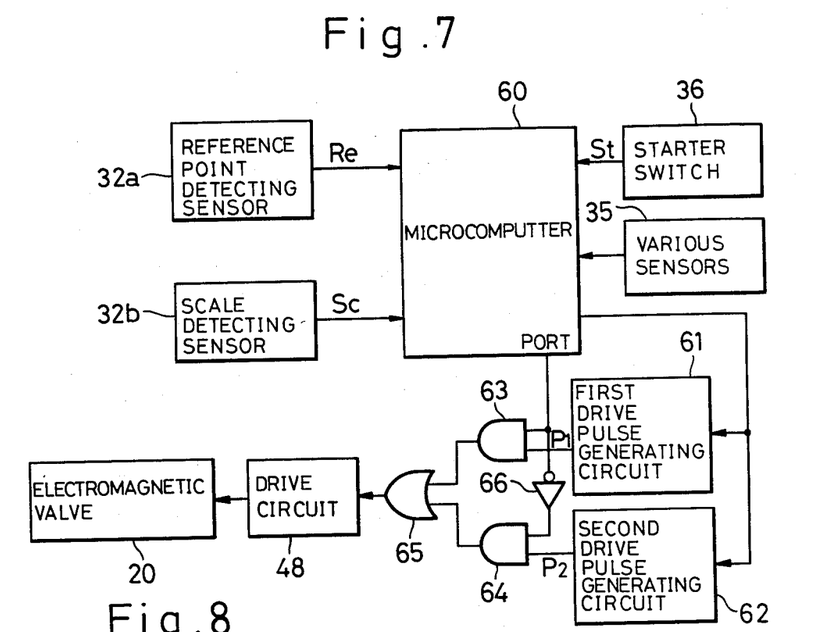
FIG. 7 is a circuit block diagram showing another embodiment of the invention, which employs a microcomputer.

FIG. 7 shows another embodiment of the invention, in which principal portions of the respective first and second control means are formed by a single microcomputer 60. The microcomputer 60 has inputted thereinto the reference pulses Re from the reference point detecting sensor 32a and the scale pulses Sc from the scale detecting sensor 32b. Further, the starter signal St from the starter switch 36 and the detecting signals from the aforesaid sensors 35 are also inputted into the microcomputer 60.

The drive pulses $P_1$ and $P_2$ from the respective first and second pulse generating circuits 61 and 62 are sent to the drive circuit 48 through respective first and second AND circuits 63 and 64 and through an OR circuit 65. A control signal from a control port of the microcomputer 60 is sent to the first AND circuit 63, and is also sent to the second AND circuit 64 through an inverter 66.

Figure 8:
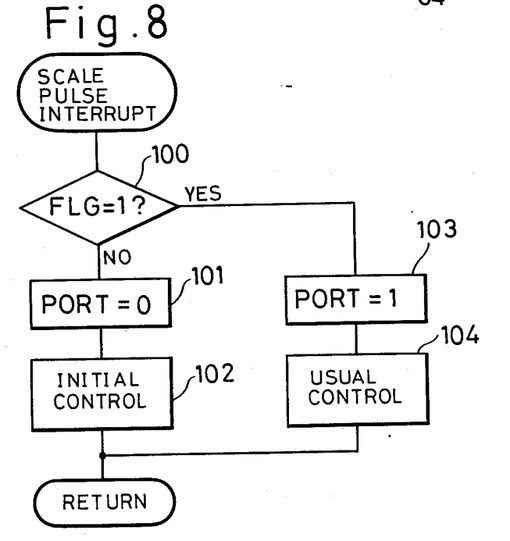
FIGS. 8 and 9 are flow charts of control executed by the microcomputer shown in FIG. 7.
Figure 9:
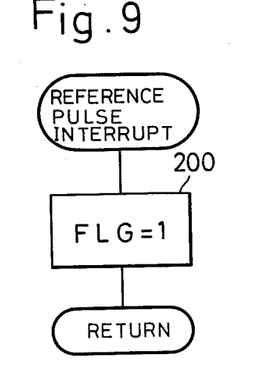

The microcomputer 60 executes interrupt routines shown respectively in FIGS. 8 and 9. That is, each time the scale pulse Sc is inputted, a flag indicative of presence and absence of inputting of the first one of the reference pulses Re is judged at a step 100 as shown in FIG. 8. When the flag is "0", the output from the control port is brought to "0" at a step 101, and an initial control is executed at a step 102. That is, the microcomputer 60 calculates a duty ratio corresponding to the battery voltage and the cooling water temperature, and sends the calculation results to the second drive pulse generating circuit 62. The second drive pulse generating circuit 62 outputs the drive pulses $P_2$ having the duty ratio obtained by the aforesaid calculation, in synchronism with the clock pulses, independently of the scale pulses Sc. At this time, the output from the control port, which is inverted by the inverter 65 into "1", is inputted into the second AND circuit 64, so that the second AND circuit 64 is opened. Thus, the drive pulses $P_2$ are sent to the drive circuit 48, so that the electromagnetic valve 20 is controlled so as to be opened and closed bit by bit at a cycle shorter than the time period required for the forward stroke of the plunger 5. This control continues until the first one of the reference pulses Re is inputted. When the battery voltage and the cooling water temperature are lower than their respective predetermined values, the duty ratio may be brought to 100%.

As the first one of the reference pulses Re is inputted, as shown in FIG. 9, the flag is brought to "1" at a step 200. Accordingly, as the scale pulses are inputted after that, it is judged at the step 100 in the interrupt routine of FIG. 8 that the flag is "1". The control port is brought to "1" at a step 103, and the usual start-up control is executed at a step 104. That is, in a manner like that of the previously described embodiment, the pulse duration and the pulse generation timing are calculated. On the basis of the calculation results, the first drive pulse generating circuit 61 outputs the drive pulse $P_1$. Since, at this time, the output "1" from the control port is inputted into the first AND circuit 63 so that the first AND circuit 63 is opened, the drive pulse $P_1$ is sent to the drive circuit 48 to control the electromagnetic valve 20.

In the above embodiment, the microcomputer 60 may have all of the functions of the respective circuits 61 through 66.

The invention should not be limited to the above-mentioned specific forms. Various modifications and variations may be made to the invention. For example, in the usual control, either one of the initiating and terminating timings of the fuel injection may be controlled by the electromagnetic valve, and the other may be controlled by other mechanical control means. That is, the electromagnetic valve is moved to the closed position just before the initiating point of the forward stroke of the plunger. At the initial stage of the forward stroke, one of the suction passages in the plunger communicates with the supply passage in the wall of the pump housing, so that the fuel within the fuel pressurizing chamber is not pressurized. In this case, communication between the suction passage and the supply passage is intercepted to initiate the fuel injection, while the electromagnetic valve is moved to the open position to terminate the fuel injection.

The rotation detecting means may take various forms. For example, the rotation detecting means may comprise a rotor having a single track, and a single sensor. In this case, N and S pole areas are regularly arranged alternately along a major portion of the entire circumferential length of the track, and this arranging manner is altered only at a single location to form a reference point. The output from the sensor forms a distinct waveform when the reference point passes by the sensor, so that reference pulses can be obtained. The rotation detecting means may be comprised of a gear wheel and a electromagnetic pickup sensor.

The rotation detecting means may be associated with the crankshaft of the engine. Further, the rotation detecting means may be divided into a reference pulse output section and a scale pulse output section, in which one of the output sections is associated with the drive shaft and the other output section is associated with the crankshaft.

The time duration setting circuit 51 of the second control means 50 in the embodiment illustrated in FIGS. 1 through 4 may calculate a pulse time duration in such a manner that the pulse time duration is brought to a duty ratio corresponding to the engine rotational speed, the fuel temperature and the like, in addition to the battery voltage and the cooling water temperature, or may calculate the pulse time duration on the basis of only the rotational speed information in such a manner that the pulse time duration is brought to a constant duty ratio. In addition, the pulse time duration may be calculated on the basis of information on the pulse separation between each pair of adjacent scale pulses, in place of the rotational speed information.

The duty ratio setting circuit 51A of the second control means 50A in the embodiment illustrated in FIG. 5 may calculate the duty ratio correspondingly to the engine rotational speed, the fuel temperature and the like in addition to the battery voltage and the cooling water temperature, or may output information of a constant duty ratio.

The release passage may not be connected directly to the fuel pressurizing chamber, but may be connected midway of the forcible-delivery passages. In this case, the release passage communicates indirectly with the fuel pressurizing chamber through the forcible-delivery passages.

There may be a case where the drive pulse is outputted only once during the forward stroke of the plunger. Also in this case, the time duration of the drive pulse is shorter than the time duration required for the forward stroke of the plunger, and the period during which the drive pulse is not outputted is also shorter than the time duration required for the forward stroke of the plunger. In particular, there is a possibility that sufficient advantages of the invention can be achieved, if the drive pulse is once outputted at the timing of the scale pulses or at the timing of pulses divided by the scale pulses. The reason for this is that the generation timing of the scale pulses or the generation timing of the pulses divided by the scale pulses has a fixed relationship to the forward stroke of the plunger.

The drive pulse indicative of the command to move the electromagnetic valve to the closed position may be brought to a low level, depending upon the type of the drive circuit for the electromagnetic valve. In addition, an electromagnetic valve of normally closed type may be employed.

Further, it is to be understood that the invention is applicable to an in-line fuel injection system in which plungers corresponding in number to the engine cylinders are accommodated in the pump housing, to a unit injector in which an injection nozzle is incorporated, together with a plunger, in a housing, and to any other types of fuel injection systems which employ electromagnetic valves.

What is claimed is:

1. A fuel injection system for an engine comprising:
   (a) a fuel injection pump having a pump housing, a plunger associated with said pump housing and reciprocatively movable in relation to rotation of a crankshaft of the engine, and a fuel pressurizing chamber associated with said pump housing and variable in volume in response to reciprocative movement of said plunger;
   (b) supply passage means supplying fuel to said fuel pressurizing chamber, said supply passage means being closed substantially during a forward stroke of said plunger and being opened substantially during a backward stroke of said plunger;
   (c) forcible-delivery passage means connecting said fuel pressurizing chamber to at least one fuel injection nozzle of the engine;
   (d) release passage means communicating with said fuel pressurizing chamber;
   (e) an electromagnetic valve provided in said release passage means and movable between a closed position where said release passage means is closed and an open position where said release passage means is opened, the fuel being released from said fuel pressurizing chamber through said release passage means for substantially a period within which said electromagnetic valve is in the open position and within which said plunger is in the forward stroke, the fuel being permitted to be pressurized within said fuel pressurizing chamber for substantially a period within which said electromagnetic valve is in the closed position and within which said plunger is in the forward stroke, the pressurized fuel being forcibly delivered to the fuel injection nozzle of the engine through said forcible-delivery passage means;
   (f) rotation detecting means for substantially detecting passage of the crankshaft of the engine through a reference rotational position to output a reference pulse each time the crankshaft passes through the reference rotational position, and for substantially detecting angular movement of the crankshaft every a predetermined angular extent to output scale pulses;

(g) first control means receiving each reference pulse and the scale pulses from said rotation detecting means to calculate current rotational angle of the crankshaft, said first control means outputting a drive pulse representative of a command moving said electromagnetic valve to the closed position, at a timing with reference to said current rotational angle, to control a period, within which said electromagnetic valve is in the closed position, during the forward stroke of said plunger, thereby controlling fuel injection; and (h) second control means intermittently outputting drive pulses representative of the command moving said electromagnetic valve to the closed position, at an initial stage of start-up of the engine, independently of the rotational angle of the crankshaft at least based on the reference pulses, wherein a time duration of each of the drive pulses outputted from said second control means is shorter than a time duration required for the forward stroke of said plunger, and a period within which each of the drive pulses is not outputted from said second control means is also shorter than the time duration required for the forward stroke of said plunger.

2. A fuel injection system as defined in claim 1, wherein said second control means outputs a plurality of drive pulses within a period of one forward stroke of said plunger, so that the fuel is injected a plurality of times.

3. A fuel injection system as defined in claim 1, wherein said second control means begins to output the drive pulses in response to receipt of a starter signal from a starter switch, and halts to output the drive pulses in response to receipt of first one of the reference pulses.

4. A fuel injection system as defined in claim 3, wherein said second control means further comprises pulse time duration setting means and drive pulse generating means, and wherein said drive pulse generating means receives the scale pulses from said rotation detecting means and receives information on a pulse time duration from said pulse time duration setting means, to output the drive pulses each having the set time duration in synchronism with the scale pulses.

5. A fuel injection system as defined in claim 4, wherein said pulse time duration setting means has inputted thereinto information at least indicative of engine cooling water temperature and a battery voltage and information substantially indicative of a pulse separation between each pair of adjacent scale pulses, said pulse time duration setting means calculating the time duration of each of the drive pulses on the basis of these information.

6. A fuel injection system as defined in claim 5, including rotational speed detecting means receiving the scale pulses for detecting rotational speed of the engine, the engine rotational speed being sent to said pulse time duration setting means as the information representative of the pulse separation between each pair of adjacent scale pulses.

7. A fuel injection system as defined in claim 3, wherein said second control means further includes duty ratio setting means and drive pulse generating means, said drive pulse generating means outputting the drive pulses of the duty ratio set by said duty ratio setting means on the basis of clock pulses.

8. A fuel injection system as defined in claim 7, wherein said duty ratio setting means calculates the duty ratio of the drive pulses on the basis of information at least on a battery voltage and an engine cooling water temperature.

9. A fuel injection system as defined in claim 3, wherein said second control means comprises drive pulse generating means for switching output levels in synchronism with the scale pulses, to output the drive pulses.

10. A fuel injection system as defined in claim 9, wherein said drive pulse generating means switches its output alternately to high and low levels each time said drive pulse generating means receives one scale pulse, to thereby output the drive pulses having the duty ratio of 50%.

11. A fuel injection system as defined in claim 9, wherein said drive pulse generating means brings the output to the high level in response to receipt of one scale pulse, brings the output to the low level in response to receipt of the next but one scale pulse, and brings the output to the high level in response to receipt of further next scale pulse, to thereby output the drive pulses having the duty ratio of about 67%.

* * * * *